(12) United States Patent
Southall et al.

(10) Patent No.: US 6,924,577 B2
(45) Date of Patent: Aug. 2, 2005

(54) BRUSH BOX ASSEMBLY

(75) Inventors: Otway Archer Southall, Farmville, VA (US); Alvin Leon Farthing, Roseboro, NC (US); Dan L. Shull, Cameron, NC (US)

(73) Assignee: Energy Conversion Systems Holdings, LLC, Dunn, NC (US)

( * ) Notice: Subject to any disclaimer, the term of this patent is extended or adjusted under 35 U.S.C. 154(b) by 11 days.

(21) Appl. No.: 10/340,985

(22) Filed: Jan. 13, 2003

(65) Prior Publication Data

US 2004/0135460 A1 Jul. 15, 2004

(51) Int. Cl.$^7$ .............................................. H02K 13/00
(52) U.S. Cl. ...................... 310/239; 310/240; 310/241; 310/242; 310/244; 310/245; 29/597; 29/596
(58) Field of Search ............................... 310/239–246; 29/596

(56) References Cited

U.S. PATENT DOCUMENTS

| | | | | |
|---|---|---|---|---|
| 3,739,205 A | | 6/1973 | Winkelmann | |
| 3,742,272 A | * | 6/1973 | Shattuck et al. | 310/239 |
| 4,082,975 A | * | 4/1978 | Azarov et al. | 310/239 |
| 4,355,254 A | * | 10/1982 | Oki et al. | 310/242 |
| 4,498,230 A | * | 2/1985 | Harris et al. | 29/597 |
| 4,613,781 A | * | 9/1986 | Sanders | 310/239 |
| 4,694,214 A | * | 9/1987 | Stewart, Sr. | 310/239 |
| 4,774,754 A | * | 10/1988 | Stewart, Sr. | 29/596 |
| 5,038,061 A | * | 8/1991 | Olsen | 310/15 |
| 5,495,134 A | * | 2/1996 | Rosenblum | 310/239 |
| 5,717,271 A | * | 2/1998 | Aoki et al. | 310/239 |
| 5,977,669 A | * | 11/1999 | Yoshida et al. | 310/68 D |
| 6,326,716 B1 | | 12/2001 | Niimi et al. | |
| 6,340,856 B1 | | 1/2002 | Schiller | |
| 2001/0013728 A1 | | 8/2001 | Harita et al. | |

FOREIGN PATENT DOCUMENTS

| | | | | |
|---|---|---|---|---|
| EP | 0282377 | | 9/1988 | |
| JP | 57043539 A | * | 3/1982 | H02K/13/00 |
| JP | 05003658 A | * | 1/1993 | H02K/41/03 |

* cited by examiner

Primary Examiner—Darren Schuberg
Assistant Examiner—Yahveh Comas
(74) Attorney, Agent, or Firm—McCarter & English, LLP

(57) ABSTRACT

A brush box assembly for use in an electric motor and an electric motor having a brush biasing mechanism that also retains the brushes to allow installation of a sliding electrical contact assembly is described. The brush box assembly has a plurality of brush holders each with a brush retention slot, a plurality of brushes each adapted to fit in the brush retention slots, the brushes having a contact face and a non-contact face, and a plurality of torsion springs each having a spring loading arm and a spring retention arm, each spring loading arm contacting one brush on the non-contact face and adapted to bias the brush against a sliding electrical contact after installation of the sliding electrical contact assembly, each spring retention arm adapted to contact one brush on the front side and retain the brush in the brush retention slot during installation of the sliding electrical contact assembly. A method of manufacture of a device having brushes with the biasing and retention mechanism is also disclosed.

22 Claims, 4 Drawing Sheets

BRUSH BOX ASSEMBLY

FIELD OF THE INVENTION

This invention relates to assemblies for biasing and retaining brushes of electric motors and other applications having sliding electric contacts where brushes are used.

BACKGROUND OF THE INVENTION

Electric motors are comprised of a stationary portion or stator and a rotating portion called an armature or a rotor. In a DC motor, the stator produces a static electric field using either an electromagnet or a permanent magnet. The armature (rotor) consists of an electromagnet on a shaft that is connected to a commutator on the same shaft. The armature spins due to the coupling of the magnetic field produced by the current flowing through the armature electromagnet and the perpendicular magnetic field of the stator magnet. To maintain constant motion through a full rotation of the armature, the current in the armature electromagnet must reverse direction as it approaches poles of opposite polarity. In a brushed DC motor, this switching is accomplished mechanically through the interaction of brushes and a commutator. The armature electromagnet can have any number of poles depending on the size of the motor and the specific application it is being used in.

In an AC slip ring motor, the magnetic field inside the rotor generates a current in the windings of the stator. Brushes contact a slip ring to pass current to the slip ring, which in turn passes the current to the rotor. The current flowing through the slip ring to the rotor creates magnetic poles that alternate with respect to the stator as the rotor rotates. The alternating magnetic fields, in turn, induce an alternating current in the stator.

Other applications, such as linear motors, linear current transfer systems, and systems to energize rotating field coils, utilize a brush-type contact to pass current to a sliding member. As used herein, sliding includes moving in a linear or a rotational direction.

An electric motor or other device using brushes generally has a system called a brush holder or brushcard mounted to the stator to hold the brushes in a fixed orientation to the rotating portion of the armature (in the case of a motor) with sufficient pressure to maintain good contact with one brush face on the commutator or slip ring. The face of the brush that is in contact with the commutator or slip ring is known as the contact face. Springs are used to bias the brushes in order to ensure the contact face maintains contact with the commutator or slip ring. Such springs can be located to the rear or side of the brush. For example, a compression coil spring in the brushholder applies force to the face opposite of the contact face, which pushes the brush forward to maintain contact with the commutator or slip ring. The face opposite of the contact face is referred to as the non-contact face.

During the manufacture of the motor or other device using brushes, the commutator or slip ring must be inserted into the brush holder to make contact with the brushes. Because the brushes are biased toward the commutator or slip ring, something must retain the brushes in the brush holder to allow for the insertion of the commutator or slip ring into the brush box assembly. A separate disposable or reusable brush retention device is used by the prior art to retain the brushes. For example, in one prior art method, a tube is placed in between the brushes to retain them, then is displaced as the commutator or slip ring is installed. This use of such a tube prevents the insertion of the commutator or slip ring into a "blind" hole, e.g. into a closed end brush holder, because the displaced tube must be removed. Alternatively, pins or clips are used to retain the brushes until the commutator or slip ring assembly is installed. After installation, the pins or clips must be removed. These methods of manufacture add extra steps and add extra devices to the manufacture of electric motors and other device using brushes.

SUMMARY OF THE INVENTION

The present invention addresses the problems of the previous brush box assemblies by providing a single mechanism that biases the brush against a sliding electrical contact and retains the brushes out of the way during installation of the sliding electrical contact assembly. The sliding electrical contact assembly is typically a commutator or slip ring assembly. The present invention allows the commutator or slip ring assembly to be installed blindly and with no additional manufacturing steps or parts associated with retaining the brushes prior to insertion of the commutator or slip ring assembly.

The brush box assembly has a plurality of brush holders each with a brush retention slot, a plurality of brushes each adapted to fit in the brush retention slots, the brushes having a contact face and a non-contact face and a plurality of torsion springs each having a spring loading arm and a spring retention arm, each spring loading arm contacting one brush on the non-contact face and adapted to bias the brush against a sliding electrical contact assembly after installation of the sliding electrical contact assembly, each spring retention arm adapted to contact one brush on the contact face and retain the brush in the brush retention slot before installation of the sliding electrical contact assembly. A method of manufacture of a device using brushes with the biasing and retention mechanism is also disclosed.

DETAILED DESCRIPTION

The following description is described in terms of a device having a slip ring assembly, but is equally applicable to any device with a brush and a sliding electrical contact assembly. For example, the present invention is also applicable to a motor having a commutator assembly, a linear motor, a linear current transfer system, or a system to energize a rotating field coil.

Figure 1:
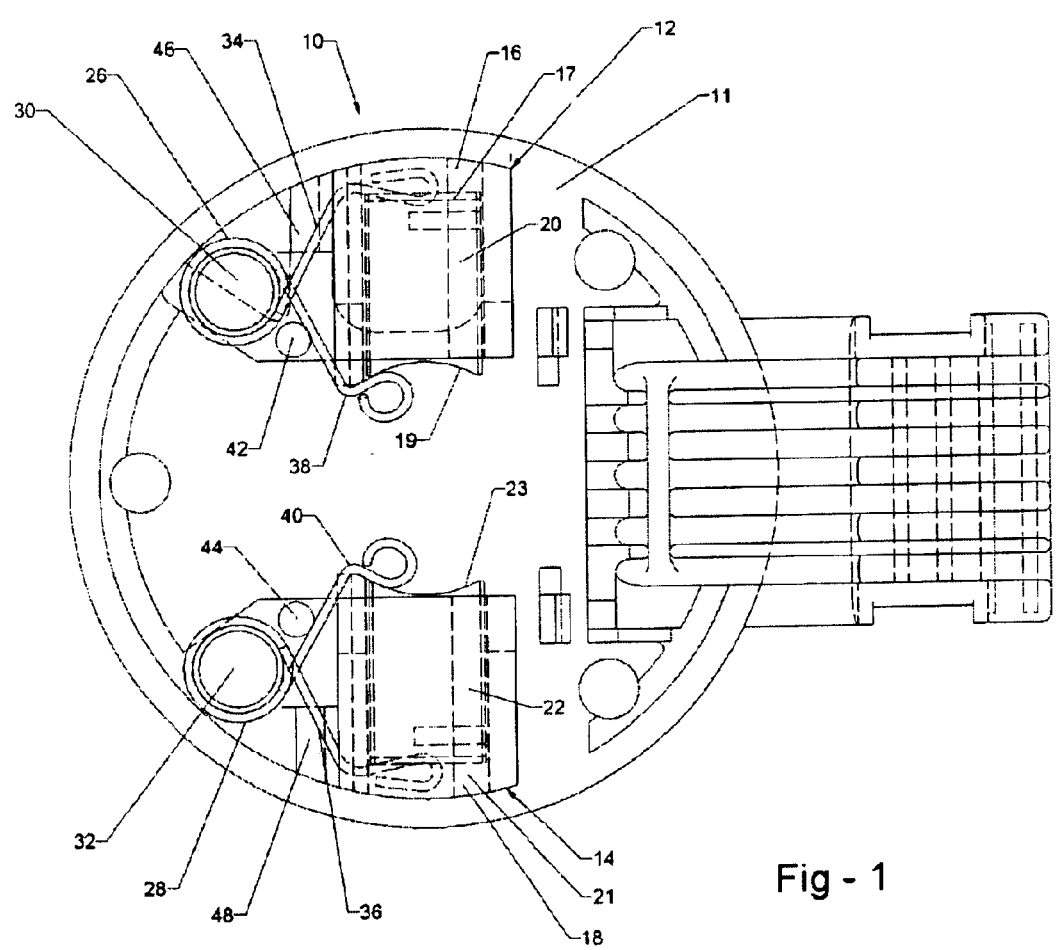
FIG. 1 is an overhead view of the brush box assembly of the present invention before the installation of a slip ring assembly.
Figure 2:
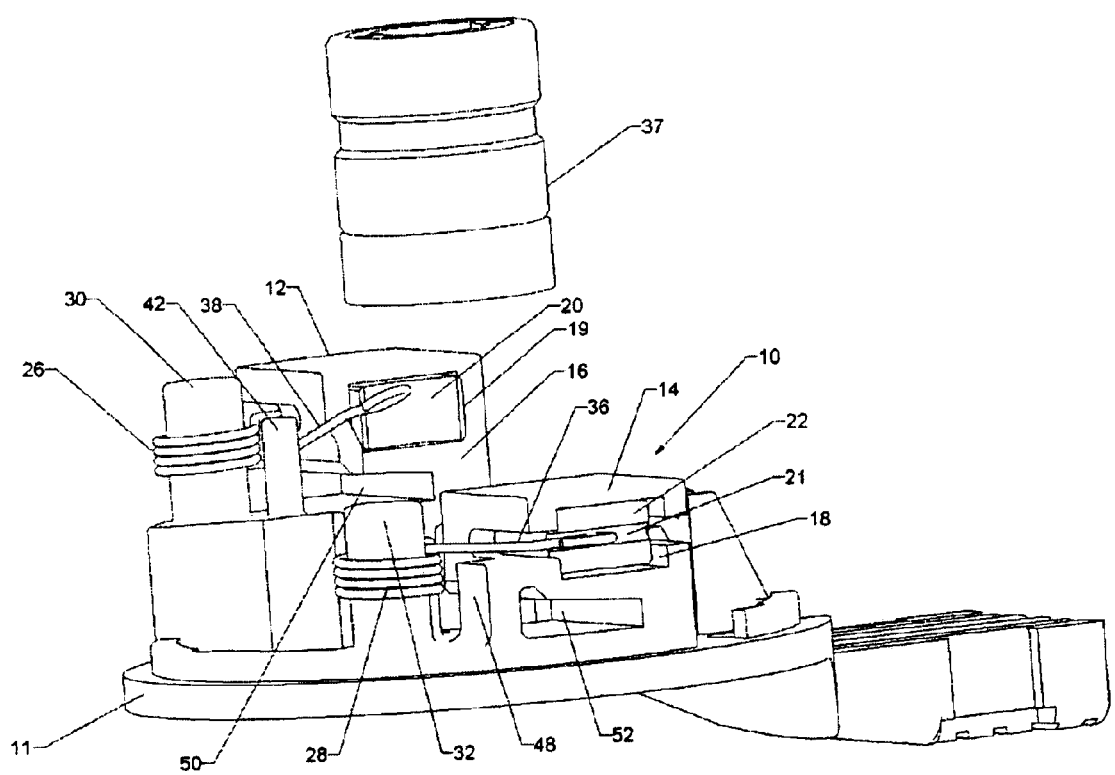
FIG. 2 is a side view of the brush box assembly of the present invention before the installation of a slip ring assembly.

FIGS. 1 and 2 illustrate a brush box assembly 10 of an embodiment of the present invention prior to the installation of a slip ring assembly. The brush box assembly is mounted on a motor endcap 11. As known to those skilled in the art, the brush box assembly is normally made of plastic, but can be made of a ceramic or a plastic with a metal backing. The brush box assembly is mounted by either snapping or bolting onto the stationary part of the system or by other methods known to those skilled in the art. The brush box assembly has two brush holders 12, 14 that each have a brush retention slot 16, 18. The brush box is normally made of brass or bronze, but is sometimes made of plastic, as is known to those skilled in the art. A brush 20, 22 is slid into each brush retention slot. The brushes 20, 22 have contact faces 19, 23 for contacting a slip ring assembly and have non-contact faces 17, 21. The brushes are prevented from side to side movement by side walls of the brush retention slots. As shown in FIG. 2, the first brush 20 is housed at a higher level than the second brush 22, but the brushes could be arranged in a variety of configurations as known to those skilled in the art. While the described embodiment has two brushes, those skilled in the art will know that multiple brushes can be used with multiple corresponding brush holders.

Torsion springs 26, 28 are mounted surrounding torsion spring posts 30, 32, which are positioned to the side of the brush holders 12, 14. Spring loading arms 34, 36 contact the non-contact faces 17, 21 of the brushes 20, 22. The spring loading arms 34, 36 have spring force from the torsion springs 26, 28, such that the spring loading arms apply a biasing spring force to the brushes 20, 22 and push them toward the front of the brush retention slots 16, 18. Prior to insertion of a slip ring assembly 37 into the brush box assembly, this force must be countered to retain the brushes 20, 22.

Spring retention arms 38, 40 contact the contact faces 19, 23 of the brushes 20, 22 and apply a retention force counter to the biasing force applied by the spring loading arms 34, 40. The torsion springs 26, 28 are prevented from over rotation by stop posts 42, 44, thereby allowing the slip ring assembly to push down the spring retention arms during installation, as explained below.

As the slip ring assembly 37 is installed in between the brush holders 12, 14 the slip ring assembly pushes the spring retention arms 38, 40 off the contact faces 19, 23 of the brushes 20, 22 and into spring retention arm slots 50, 52. With the spring retention arms off the contact faces 19, 23 of the brushes 20, 22, the spring loading arm applies its spring force to the non-contact face 17, 21 of each brush biasing the brushes in contact with the slip ring.

Figure 3:
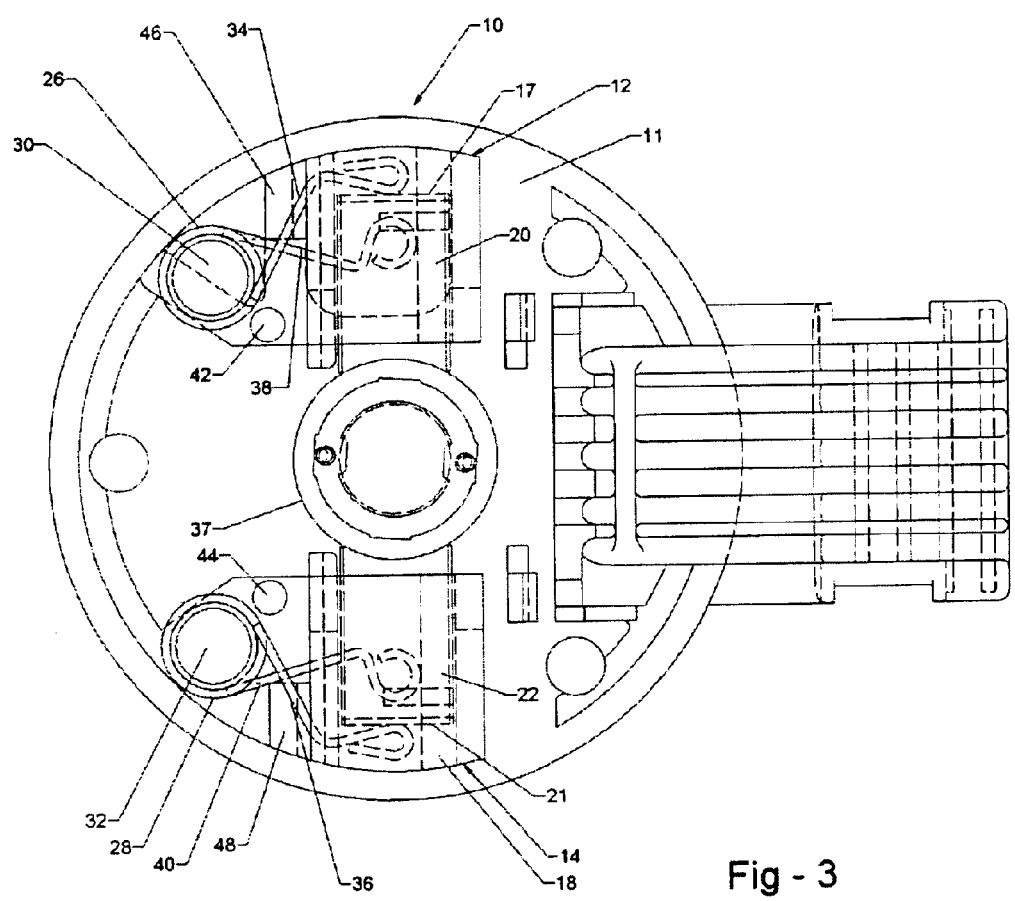
FIG. 3 is an overhead view of the brush box assembly of the present invention after the installation of a slip ring assembly.
Figure 4:
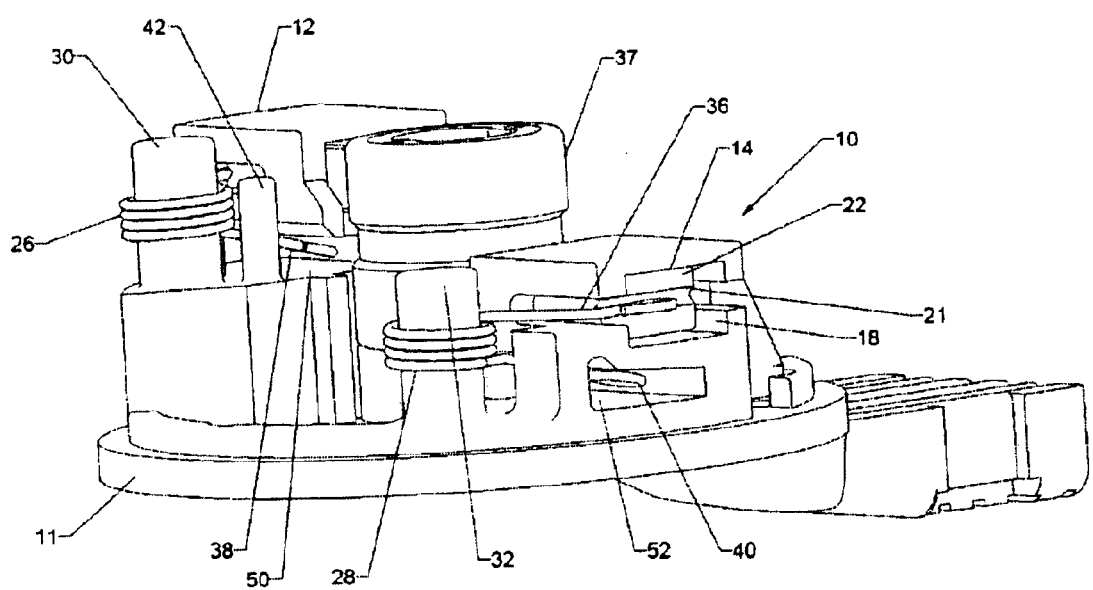
FIG. 4 is a side view of the brush box assembly of the present invention after the installation of a slip ring assembly.

FIGS. 3 and 4 illustrate an embodiment of the invention after the slip ring assembly 37 has been installed. The spring loading arms 34, 36 keep the brushes 20, 22 biased against the slip ring 37 and the spring retention arms 38, 40 are out of the way in the spring retention arm slots 50, 52 (as shown in FIG. 4). After installation of the slip ring assembly, the torsion springs 26, 28 are prevented from over rotation by stop sections 46, 48.

The foregoing is provided for the purpose of illustrating, explaining and describing embodiments of the present invention. Further modifications and adaptations to these embodiments will be apparent to those skilled in the art and may be made without departing from the spirit of the invention or the scope of the following claims.

We claim:

1. A brush box assembly, comprising:
 a. a plurality of brush holders each with a brush retention slot;
 b. a plurality of brushes each adapted to fit in the brush retention slots, the brushes having a contact face and a non-contact face; and
 c. a plurality of torsion springs each having a spring loading arm and a spring retention arm, each spring loading arm contacting one brush on the non-contact face and adapted to bias the brush against a sliding electrical contact assembly after installation of the sliding electrical contact assembly, each spring retention arm adapted to contact one brush on the contact face and retain the brush in the brush retention slot before installation of the sliding electrical assembly.

2. The brush box assembly of claim 1, wherein the sliding electrical contact assembly is a commutator or slip ring assembly.

3. The brush box assembly of claim 2, wherein each spring retention arm is in contact with each contact face of the brushes before the commutator or slip ring assembly is installed and each spring retention arm is removed from the contact faces of the brushes by the commutator or slip ring assembly during installation.

4. The brush box assembly of claim 3, further comprising spring retention arm slots wherein each spring retention arm is removed from the contact face of the brush by the commutator or slip ring assembly into the spring retention arm slot during installation of the commutator or slip ring assembly.

5. The brush box assembly of claim 4, further comprising stop sections positioned to prevent the over rotation of the torsion springs.

6. The brush box assembly of claim 2, further comprising stop posts positioned to prevent the over rotation of the torsion springs and keep the brushes in the brush retention slots allowing the commutator or slip ring assembly to be installed and the spring retention arms to be removed from the contact face of the brushes by the commutator or slip ring assembly.

7. The brush box assembly of claim 1, wherein there are at least two brushes and two corresponding torsion springs.

8. The brush box assembly of claim 1, wherein the brushes are made from carbon.

9. The brush box assembly of claim 2, wherein the brush box assembly is mounted on an endcap of an electric motor.

10. The brush box assembly of claim 1, wherein the brush box assembly is used in a linear motor.

11. The brush box assembly of claim 1, wherein the brush box assembly is used in a linear current transfer system.

12. The brush box assembly of claim 1, wherein the brush box assembly is used in a system to energize a rotating field.

13. An electric motor, comprising:
 a. an endcap;
 b. a commutator or slip ring assembly;
 c. a brush box assembly mounted on the endcap, the brush box assembly having a plurality of brush holders each with a brush retention slot;
 d. a plurality of brushes each adapted to fit in the brush retention slots, the brushes having a contact face and a non-contact face; and
 e. a plurality of torsion springs each having a spring loading arm and a spring retention arm, each spring loading arm contacting one brush on the non-contact face and adapted to bias the brush against a commutator or slip ring assembly after installation of the commutator or slip ring assembly, each spring retention arm adapted to contact one brush on the contact face and retain the brush in the brush retention slot before installation of the commutator or slip ring assembly.

14. The electric motor of claim 13, wherein each spring retention arm is in contact with each contact face of the brushes before the commutator or slip ring assembly is installed and each spring retention arm is removed from the contact faces of the brushes by the commutator or slip ring assembly during installation.

15. The electric motor of claim 13, further comprising spring retention arm slots wherein each spring retention arm is removed from the contact face of the brush by the commutator or slip ring assembly into the spring retention arm slot during installation of the commutator or slip ring assembly.

16. The electric motor of claim 13, further comprising stop sections positioned to prevent the over rotation of the torsion springs.

17. The electric motor of claim 13, further comprising stop posts positioned to prevent the over rotation of the torsion springs and keep the brushes in the brush retention slots allowing the commutator or slip ring assembly to be installed and the spring retention arms to be removed from the contact face of the brushes by the commutator or slip ring assembly.

18. The electric motor of claim 13, wherein there are at least two brushes and two corresponding torsion springs.

19. A method of manufacturing a device utilizing brushes and a commutator or slip ring assembly, comprising:

a. inserting the commutator or slip ring assembly having a commutator or slip ring into a brush box assembly having brushes, each having a contact face and a non-contact face, retained out of the way of the commutator or slip ring assembly by torsion springs, each contacting one brush on the contact face and the non-contact face; and b. moving each torsion spring off the contact faces of the brushes with the commutator or slip ring assembly so that the brushes are biased against the commutator or slip ring by the torsion springs.

20. The method of claim 19, wherein each torsion spring has a spring loading arm and a spring retention arm, each spring loading arm contacting one brush on the non-contact face and adapted to bias the brush against a commutator or slip ring assembly after installation of the commutator or slip ring assembly, each spring retention arm adapted to contact one brush on the contact face and retain the brush in the brush retention slot before installation of the commutator or slip ring assembly.

21. The method of claim 20, wherein the retention arms are moved from the contact faces into retention arm slots by the commutator or slip ring assembly.

22. The method of claim 19, wherein there are at least two brushes and two corresponding torsion springs.

* * * * *